Aug. 6, 1957 H. G. WEBSTER 2,801,609
SALT SPOOL HOLDERS
Filed Feb. 17, 1953 2 Sheets-Sheet 1

INVENTOR.
HUGH GRAY WEBSTER
BY
Reynolds, Beach & Christensen
ATTORNEYS

Aug. 6, 1957 H. G. WEBSTER 2,801,609
SALT SPOOL HOLDERS
Filed Feb. 17, 1953 2 Sheets-Sheet 2
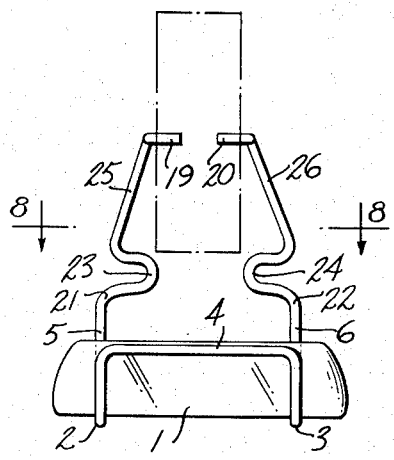
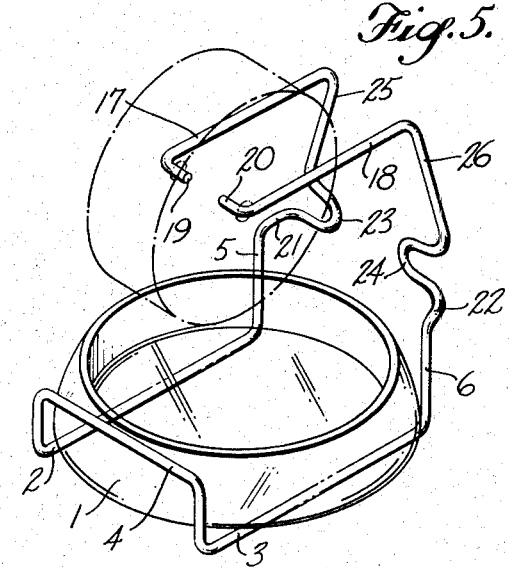
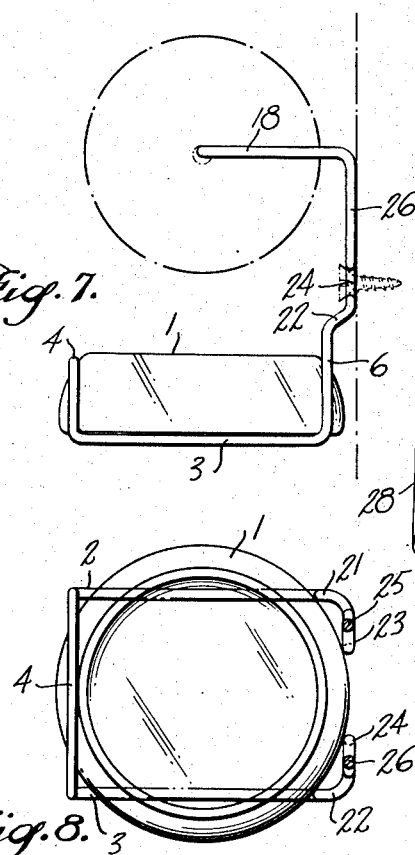
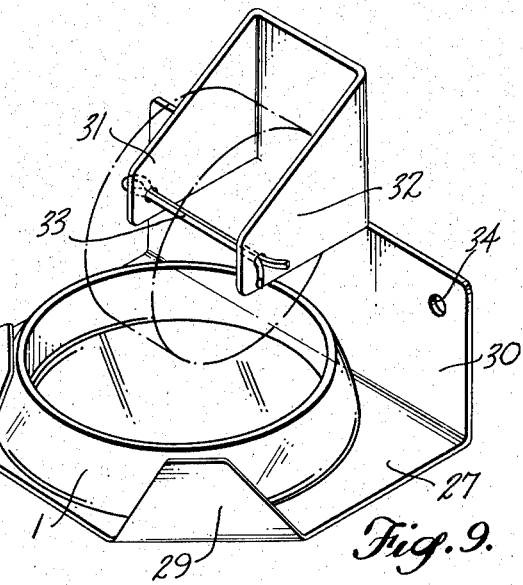
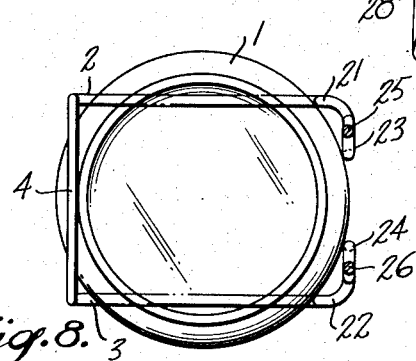
INVENTOR.
HUGH GRAY WEBSTER
BY
ATTORNEYS United States Patent Office 2,801,609
Patented Aug. 6, 1957

2,801,609

SALT SPOOL HOLDERS

Hugh Gray Webster, near Edmonds, Wash.

Application February 17, 1953, Serial No. 337,337

2 Claims. (Cl. 119—51)

The present invention relates to a holder for spools of salt used for an animal salt lick. Such salt spools are customarily provided for small animals such as rabbits, particularly when raised in confinement.

It is an object of the present spool holder to support such a spool for easy access of an animal to all parts of it, and to enable the spool to be turned readily in various rotative positions so that it will be worn away evenly about its periphery.

A concentrated salt solution is very corrosive, and since pens in which small animals are kept are usually made of wire mesh material, any drip from a salt lick tends to corrode wire upon which it drops. An object of the present invention, therefore, is to provide a convenient receptacle for catching such drip without decreasing the accessibility of the salt spool. Moreover, the holder is constructed to retain such receptacle securely in place beneath the salt spool, although it can be removed quickly and easily for cleaning or replacement.

It is an object to provide a salt spool and drip receptacle holder of unitary construction, which can be mounted easily in an animal pen.

It is a further object to provide a holder having the advantages mentioned, which nevertheless is of simple construction, light in weight, economical to manufacture and durable.

Such a salt spool and drip receptacle holder may conveniently be made of wire have its lower portion bent to form a receptacle-holding cradle and its upper portion arranged to engage in a central hole of the salt spool to support it rotatively in position immediately above the drip receptacle. Between the spool-holding and receptacle-supporting portions of the holder the wire may be formed or provided with anchoring or mounting structure such as may receive mounting screws.

Alternatively, the holder may be made of sheet metal formed to provide a receptacle cradle, a spool holder and a mounting portion interconnecting these two parts.

The various forms of holder shown in the accompanying drawings have the advantages and fulfill the objects mentioned above.

Figure 5 is a top perspective view of still another type of salt spool holder somewhat similar to that shown in Figure 3, and Figure 6 is a front elevation view of such holder. Figure 7 is a side elevation view of the same holder, and Figure 8 is a horizontal sectional view through the holder, taken on line 8—8 of Figure 6.

Figure 9 is a top perspective view of a salt spool holder made of sheet metal in contrast to the wire construction of the other types of holder illustrated.

Figure 1:
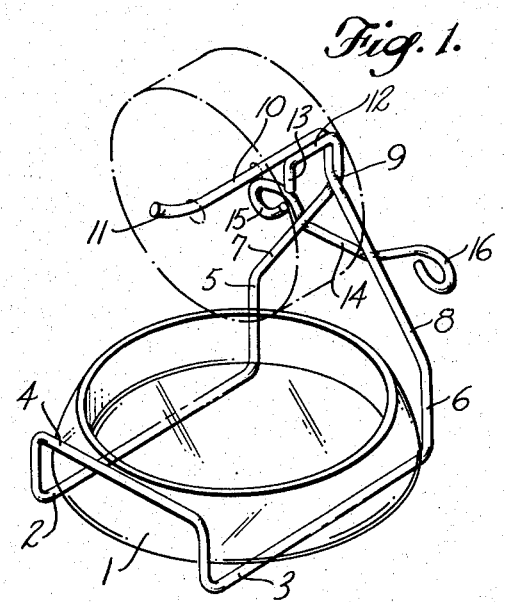
Figure 1 is a top perspective view of one type of salt spool holder including a drip receptacle and its supporting cradle.

The salt spool holder to which the present invention pertains is intended primarily for affording to small domestic animals a source of salt and other minerals which may be incorporated in the form of a spool an inch or two in diameter and having a central axial bore. Customarily such salt spools are suspended on a string or wire loop, or may be held by a nail driven through the bore as an axle. The difficulty with such arrangements is that considerably more time is consumed in replacing excessively worn spools with new ones than is necessary with the holder of the present invention, and where such a spool is suspended by a string or a wire, it may not be held sufficiently steady to be licked effectively by the animal, and any drip resulting from the animal's saliva is inclined to be spread about or spattered more than necessary. Moreover, such suspensions are not particularly durable and may break, so that the spool is allowed to fall onto the floor of the enclosure. If this is of wire mesh, the saline drip will cause it to corrode.

The salt spool holder of the present invention in its various forms supports the salt spool securely for ready rotation about its axis and in a position directly above a drip catching receptacle 1. Conveniently, this receptacle may be a small furniture caster cup of glass or other nonmetallic material which is of heavy, rugged construction. Such a receptacle has an outer surface of truncated conical shape providing annular base portion projecting a substantial distance outward from its upper edge.

In all the forms of spool holder shown in Figures 1 to 8, inclusive, the receptacle 1 is received in a cradle formed of two parallel wires 2 and 3, corresponding ends of which are connected by a cross wire 4 located a substantial distance above the wires 2 and 3 and engaging over the base projection at one side of the receptacle 1 when it is seated on the wires 2 and 3. Joined to the other corresponding ends of wires 2 and 3 are upright wire portions 5 and 6 connected to the holder mounting and spool supporting superstructure of the holder. These upright portions are spaced from the cross wire 4 such that the base projection of receptacle 1 is received snugly in the angles between wires 2 and 5 and wires 3 and 6 when the cross wire 4 is engaged over the base projection.

Figure 2:
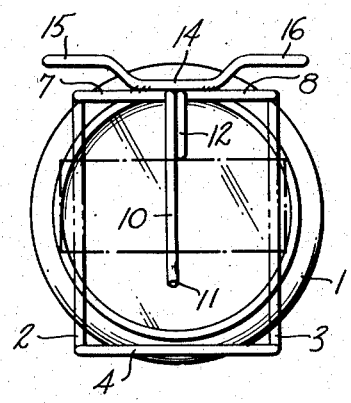
Figure 2 is a plan view of such holder.

In the spool holder of Figures 1 and 2 wire portions 7 and 8 have their lower ends connected to the upper ends of wire portions 5 and 6 and converge upwardly to cooperate in a lap joint 9, at which these wire portions may be spot welded. One of these wire portions, such as the portion 8, then has joined to its upper end a horizontal spool axle portion 10 projecting from the wire portion 8 over the drip receptacle 1. The free end of this spool axle remote from the interconnecting portion 7, 8 of the holder may be bent upward slightly so that when the bore of a spool is pushed over the axle wire it canot be pulled off freely. The bent wire end portion 11 and the axle wire 10 will be appreciably smaller than the bore of the salt spool, and the bent end will be deflected from alignment with the axle 10 through only a small angle, so that the spool may be pushed onto the axle without too great difficulty, and when it has thus been mounted, the spool will rotate freely on the axle. The wire forming this axle will, however, be sufficiently stiff and thick so that it will not be bent easily by a force applied radially to the periphery of the spool.

To the other interconnecting section wire 7 is joined a second horizontal wire portion 12, which extends from the connecting wire portion 7 in the same direction as axle 10 and lies alongside it. The free end portion 13 of this wire is bent at an abrupt angle to the wire portion 12, such as perpendicular to it, at a location spaced from the bent wire end portion 11, such that the axial length of the spool will be accommodated easily between these two bent portions. The wire portion 13 and the wire portion 11 thus serve as stops limiting excessive free axial movement of the spool so that it will be maintained in a position approximately centrally above the drip receptacle 1, as shown in broken lines in Figure 2. While the wire portion 13 is shown bent downward, it may, of course, be bent in any direction substantially in a vertical plane, which does not conflict with the spool axle 10.

The salt spool holder conveniently may be supported on a wall by securing screws or nails. To accommodate such screws or nails a spreader wire 14 may span the space between the converging wires 7 and 8 generally centrally between the lap joint 9 and the upright wire portions 5 and 6. This spreader wire may extend generally horizontally across such wires and be spot-welded to them. The ends of such spreader wire projecting beyond wires 7 and 8 may be curled to form apertured screw or nail-receiving ears 15 and 16. Preferably these ears are offset from the plane in which wire portions 5, 6, 7 and 8 are disposed in a direction away from the receptacle supporting cradle formed by wires 2 and 3, so that such ears will project beyond wires 5 and 6 at least as far as the base projection of receptacle 1 when received in the cradle, and perhaps somewhat farther as shown in Figure 2, to afford adequate clearance for removal and replacement of the drip receptacle.

In installing the salt spool holder screws or nails would be inserted through the apertured ears 15 and 16 to secure the holder in a position with the wires 2 and 3 on or slightly above the floor of the animal pen. The drip receptacle then would be inserted in the cradle by engaging one side of the base projection beneath the cross wire 4 with the receptacle in tilted position, and then the opposite side of the receptacle would be pressed downward alongside wires 5 and 6 until the bottom of the receptacle rested firmly on wires 2 and 3. The salt spool would then be positioned by pressing its bore over the bent end portion 11 of the axle 10 until an end face of the spool had been pressed against the bent wire end 13.

It will be evident that the salt spool may be worn away both radially and axially without dislodging the spool from the axle 10. Since the wear occurs primarily on the periphery of the spool, there is little danger that it would become so thin axially as to be slipped off over the bent end 11 by the licking of an animal. At any time, however, the spool may be pulled off the axle with little trouble. Also, the drip receptacle can be removed easily for cleaning by merely lifting up the side adjacent to upright wires 5 and 6 and lifting the receptacle upwardly while held in inclined position until the base projection at the opposite side of the receptacle clears cross wire 4. Alternatively, when thus tilted the receptacle may be slide out sidewise across wire 2 or wire 3.

Instead of the salt spool holder having an axle extending parallel to the drip receptacle supporting wires 2 and 3 and transversely of the interconnecting structure between the spool axle and the drip receptacle cradle as in the form of Figure 1, the spool axle may extend transversely of wires 2 and 3 and generally parallel to such interconnecting structure. With such a construction the spool will be supported with its axis parallel to the holder supporting structure formed by ears 15 and 16 instead of transversely of such structure. This type of salt spool holder is shown in Figures 3 to 8, inclusive.

Figure 3:
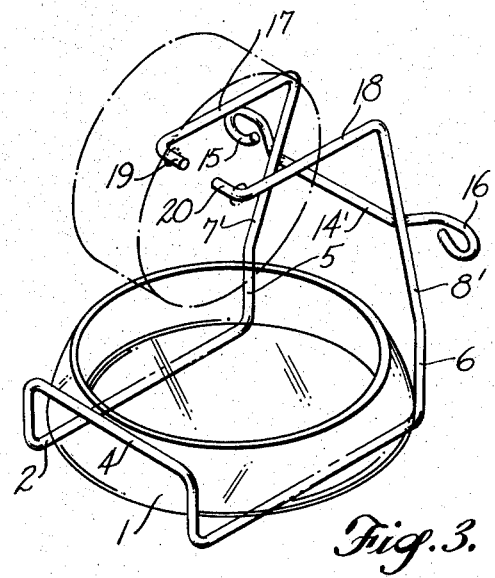
Figure 3 is a top perspective view of a different type of salt spool holder.
Figure 4:
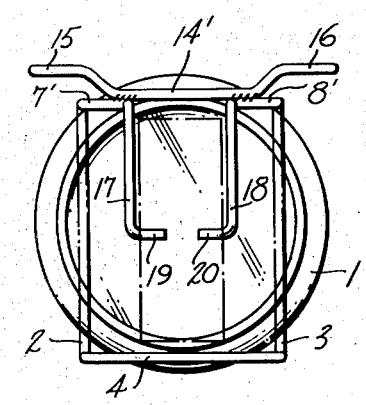
Figure 4 is a plan view of such holder.

In the salt spool holder shown in Figures 3 and 4, the cradle for receptacle 1 is the same as previously described, including wire portions 2, 3, 4, 5 and 6, which are all interconnected. Also, the lower portion of the structure interconnecting the drip receptacle cradle and the spool holder or axle structure including the wires 7' and 8' converging upwardly from the upper ends of wire portions 5 and 6 is virtually the same except that these wire portions do not overlap at their upper ends but are spaced apart a distance slightly greater than the axial thickness of a salt spool. The spool holder mounting structure also is virtually the same as previously described, including the spreader wire 14', spot-welded to wires 7' and 8', generally centrally between their ends, to hold them in rigidly spaced relationship, and the looped nail or screw receiving mounting ears 15 and 16 constitute the ends of this spreader wire.

To the upper ends of converging wires 7' and 8' are joined respectively the horizontal parallel wires 17 and 18 extending transversely of the wires 7' and 8' to a position directly above the drip receptacle 1. The wire portions 17 and 18 are somewhat longer than the radius of the largest salt spool to be supported by the holder. The adjacent ends of wires 17 and 18 remote from wires 7' and 8' are bent toward each other to form axle portions 19 and 20, respectively. The adjacent ends of these bent axle portions are spaced apart a substantial distance and may be spread by deflecting wires 17 and 18 to receive between them the salt spool. These axle portions will extend substantially diametrically of the drip receptacle to hold the salt spool centrally over it.

This type of salt spool holder may be installed in a manner similar to that described in connection with the spool holder of Figures 1 and 2 by screws or nails extending through ears 15 and 16. The receptacle 1 is then placed in its cradle in the same manner. Wires 17 and 18 will be sufficiently resilient so that when they are deflected to insert ends 19 and 20 into the opposite ends of the spool bore the wires will spring back into substantially parallel relationship. In this position it is preferred that reasonable clearance be left between the end faces of a fresh spool and the wires to enable the spool to be turned easily, as indicated in Figure 4. Until the spool has been worn away to a small size, the axle portions 19 and 20 will hold it in proper position, although both the spool and the receptacle can be removed readily whenever desired.

The modification shown in Figures 5, 6, 7 and 8 is very similar to the spool holder of Figures 3 and 4. It includes the same type of drip receptacle cradle, composed of wires 2, 3, 4, 5 and 6 and the same type of split spool supporting axle 19, 20 and axle supporting wires 17 and 18. The difference resides in the wire structure interconnecting the drip receptacle cradle and the spool holder.

Such interconnecting structure includes the wire portions 21 and 22 joined to the upper ends of upright wire portions 5 and 6 which are offset rearwardly to carry the supporting ears 23 and 24 which are formed as an integral part of the wire frame. The loops 23 and 24 extend toward each other and are bent to receive mounting screws or nails indicated in broken lines in Figure 7. From these loops wires 25 and 26 extend convergently upwardly, and their upper ends are joined to the adjacent corresponding ends of axle supporting wires 17 and 18. Since the spool supporting and drip receptacle cradle portions of this spool holder are the same as those of Figures 3 and 4, the spool may be placed and removed in the same manner as described above, and the drip receptacle may be inserted and released also as described.

It will be seen that the wire spool holders described may be constructed simply and economically. The types shown in Figures 1 and 2 and in Figures 3 and 4 are constructed of two pieces of wire bent to the proper shape. In the holder of Figure 1 the wires are welded together at three points, and in the type of Figures 3 and 4 the wires are welded together at two points. The spool holder shown in Figures 5, 6, 7 and 8 is made from a single length of wire bent to the proper shape, and no welds are required. For the upper weld in the holder of Figure 1 and Figure 2 a wire twist may be substituted for the weld if desired.

A salt spool holder involving the same principles of construction but made of sheet metal is shown in Figure 9. In this instance the cradle for the receptacle 1 is a flat shelf 27 having corner portions 28 and 29 bent through somewhat more than a right angle to overlie the base projection of the drip receptacle generally at one side of it. From the edge of the shelf 27 opposite ears 28 and 29 a mounting flange 30 is bent upwardly, which also serves the function of interconnecting the cradle and spool supporting structure. The width of the shelf 27 between the ears 28 and 29 and the flange 30 is such that the drip receptacle will be received snugly between these parts, as shown in Figure 9.

Side portions of flange 30, forming its upper edge, are bent from its plane into parallel positions perpendicular to such plane to form spool supporting arms 31 and 32. The ends of these arms extend from the interconnecting flange structure 30 to a location generally centrally above the drip receptacle 1 and have corresponding apertures through which a spool supporting axle 33 may be inserted. These arms are spaced apart sufficiently to receive between them the axial width of a salt spool. Conveniently a cotter pin may constitute the axle for such spool, which will be of a size small enough to leave adequate clearance between it and the bore of the salt spool.

Holes 34 may be provided at suitable locations in the interconnecting flange 30 to receive mounting screws or nails for supporting this salt spool holder. It will be evident that the spool may be removed by withdrawing the cotter pin, and the drip receptacle can be taken out by lifting the side adjacent to interconnecting structure 30 and then raising the entire cup while held in inclined position until the edge adjacent to ears 28 and 29 clears them.

I claim as my invention:

1. A salt spool holder comprising two substantially parallel wire base portions spaced apart horizontally and adapted to support a drip receptacle, upright wire portions turned upward from the opposite ends of both of said wire base portions and adapted for disposition along opposite sides of the drip receptacles supported on said wire base portions, and retaining wire means turned from the upper portions of two adjacent ones of said upright wire portions and adapted to retentively engage a portion of a drip receptacle supported on said wire base portions, the upper parts of the other two adjacent upright wire portions extending a substantial distance above said retaining wire means and both upper parts of said other two adjacent upright wire portions being turned at an angle to the upwardly extending parts of such wire portions, and such upper parts further having their ends turned toward each other to define cooperatively a substantially horizontal axle disposed generally centrally above said wire base portions for engagement with opposite ends of the central aperture of a salt spool.

2. A salt spool holder comprising two substantially parallel wire base portions spaced apart horizontally, a drip receptacle standing on said two wire base portions, upright wire portions turned upward from the opposite ends of both of said wire base portions and adapted for disposition along opposite sides of said drip receptacle supported on said wire base portions, and retaining wire means turned from the upper portions of two adjacent ones of said upright wire portions, bridging substantially horizontally between said two wire base portions at an elevation a substantial distance above said wire base portions and overlying a portion of said drip receptacle to restrain upward movement of said receptacle from said wire base portions, the upper parts of the other two adjacent upright wire portions extending a substantial distance above said retaining wire means and at least one thereof being turned to define a substantially horizontal axle disposed generally centrally above said drip receptacle for engagement by the central aperture of a salt spool.

References Cited in the file of this patent

UNITED STATES PATENTS

| D. 39,996 | Michaelis | May 18, 1909 |
| D. 173,883 | Postal | Jan. 18, 1955 |
| 138,538 | Sherwood | May 6, 1873 |
| 338,402 | Griswold | Mar. 23, 1886 |
| 450,419 | McIlhenny et al. | Apr. 14, 1891 |
| 1,329,186 | Kindig | Jan. 27, 1920 |
| 1,409,255 | Smith | Mar. 14, 1922 |
| 1,423,612 | Jewett | July 25, 1922 |
| 2,456,535 | Rundell | Dec. 14, 1948 |